US007346426B2

(12) United States Patent
Xu

(10) Patent No.: US 7,346,426 B2
(45) Date of Patent: Mar. 18, 2008

(54) AUTOMATIC DOTTING MACHINE FOR MANUFACTURE OF HEAT SINK FOR ELECTRONIC COMPONENT

(75) Inventor: Xiang-Yang Xu, Guangdong (CN)

(73) Assignees: Fu-Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 201 days.

(21) Appl. No.: 11/308,078

(22) Filed: Mar. 6, 2006

(65) Prior Publication Data

US 2007/0208446 A1 Sep. 6, 2007

(51) Int. Cl.
*G06F 17/00* (2006.01)
*G06F 19/00* (2006.01)

(52) U.S. Cl. ...................................... 700/228; 700/165

(58) Field of Classification Search ................. 700/228
See application file for complete search history.

(56) References Cited

U.S. PATENT DOCUMENTS 4,355,530 A * 10/1982 Chen ......................... 72/452.5
4,391,123 A * 7/1983 Salvagnini ................... 72/464
4,435,143 A * 3/1984 Dempsey .................... 425/150
4,558,616 A * 12/1985 Sakamoto .................... 83/399
4,602,541 A * 7/1986 Benzinger et al. ............. 83/36
4,760,729 A * 8/1988 Kaminski .................... 72/456
4,761,988 A * 8/1988 Kato ......................... 72/452.5
4,782,438 A * 11/1988 Mizukado et al. ............ 700/86
5,080,031 A * 1/1992 Suzuki et al. ............... 112/286
5,467,633 A * 11/1995 Kato ......................... 72/452.3
5,733,079 A * 3/1998 Jessee et al. .................. 409/79
6,070,540 A * 6/2000 Nomura et al. ............... 112/68
6,393,693 B1 5/2002 Finocchi
2001/0054223 A1* 12/2001 Yamanashi et al. ........... 29/563

* cited by examiner

*Primary Examiner*—Thomas K Pham
(74) *Attorney, Agent, or Firm*—Winston Hsu

(57) ABSTRACT

An automatic dotting machine (100) includes a feeding device (10) for unloading workpieces (200) one by one with the same interval, a conveying device (40) for conveying the workpieces to a predetermined dotting region, a sensor unit (70, 251) for detecting whether the workpieces reach the predetermined dotting region, a programmed control unit (30) for controlling the whole process of the dotting and receiving signal detected by the sensor unit and then sending out a command, a sliding device for moving the workpieces to a predetermined dotting position after receiving the command of the programmed control unit, a positioning device for clamping and positioning the wokpieces to the predetermined position to be dotted, and a punching device (24) for punching dents on the workpieces after the workpieces are positioned at the predetermined position.

17 Claims, 11 Drawing Sheets

20

AUTOMATIC DOTTING MACHINE FOR MANUFACTURE OF HEAT SINK FOR ELECTRONIC COMPONENT

FIELD OF THE INVENTION

The present invention relates to an automatic dotting machine, and particularly to an automatic dotting machine suitable for performing punching dots in a workpiece in a programmable manner, wherein the workpiece is to be used as a part of a heat dissipation device for electronic component.

DESCRIPTION OF RELATED ART

During the machining process, holes are usually required to be formed in a workpiece. However the hole forming process is boring and inaccurate. It needs not only drawing crossed lines in a predetermined position for forming the hole but also making a depression by dotting a crossed point of the crossed lines for facilitating an accurate forming of the hole at the required position.

The operation of the dotting has a relatively low efficiency since it is generally most done by manual hand.

SUMMARY OF INVENTION

According to a preferred embodiment of the present invention, an automatic dotting machine comprises a feeding device for unloading workpieces one by one with the same interval, a conveying device for conveying the workpieces to a predetermined dotting region, a sensor unit for detecting whether the workpieces reach the predetermined dotting region, a programmed control unit for controlling the whole process of the dotting and receiving signal detected by the sensor unit and then sending out a command, a sliding device for moving the workpieces to a predetermined dotting position after receiving the command of the programmed control unit, a positioning device for clamping and positioning the wokpieces to the predetermined position to be dotted, and a punching device for punching dents on the workpieces after the workpieces are positioned at the predetermined position.

Other advantages and novel features of the present invention will become more apparent from the following detailed description of preferred embodiment when taken in conjunction with the accompanying drawings, in which:

DETAILED DESCRIPTION

Figure 1:
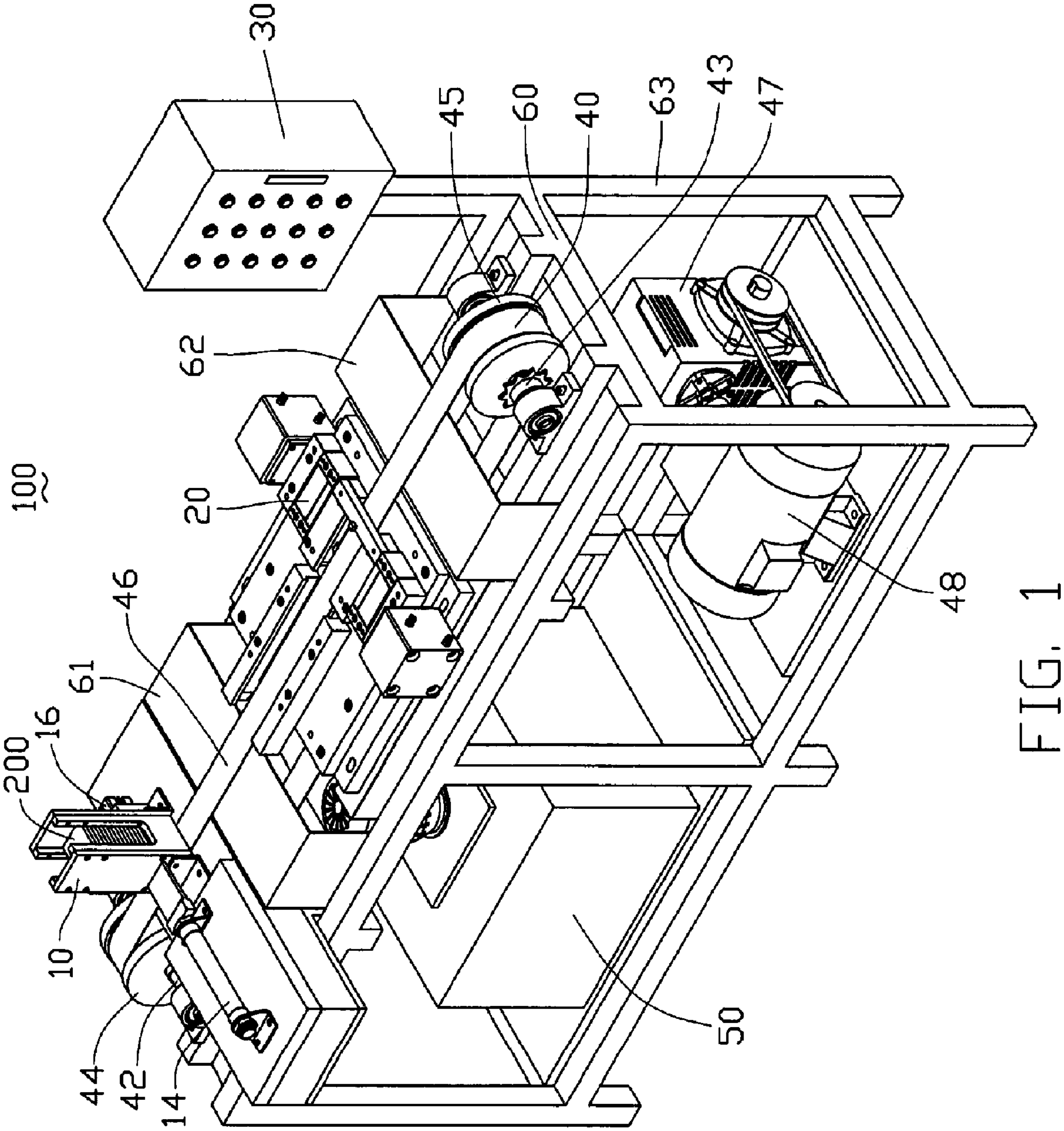
FIG. 1 is an assembled, isometric view of an automatic dotting machine according to the invention.

With reference to FIG. 1, there is generally indicated an automatic dotting machine 100 for dotting a plurality of dents in each of a plurality of workpieces 200 which herein have been shown as being a flat metal plates according to the invention. The workpieces 200 are used as bases for construction of heat sinks for dissipating heat generated by electronic components. In practice, the workpieces 200 are used to thermally contact with the electronic components and bear fins thereon. The dotting machine 100 comprises a rectangular bed 60 having support uprights 63, a conveying device 40 mounted on the bed 60 for receiving and conveying the workpieces 200 to a predetermined dotting region, an automatic feeding device 10 for unloading the workpieces 200 at the same intervals to the conveying device 40, a working apparatus 20 for dotting the workpiece 200, a programmed control unit 30 for controlling the whole dotting process and a hydraulic actuator 50 for providing the working apparatus 20 with required driving force. The whole process for dotting one of the workpieces 200 only spends two seconds, according to the invention. Such a cycle time is considered quit efficient, in comparison with the conventional art.

Figure 2:
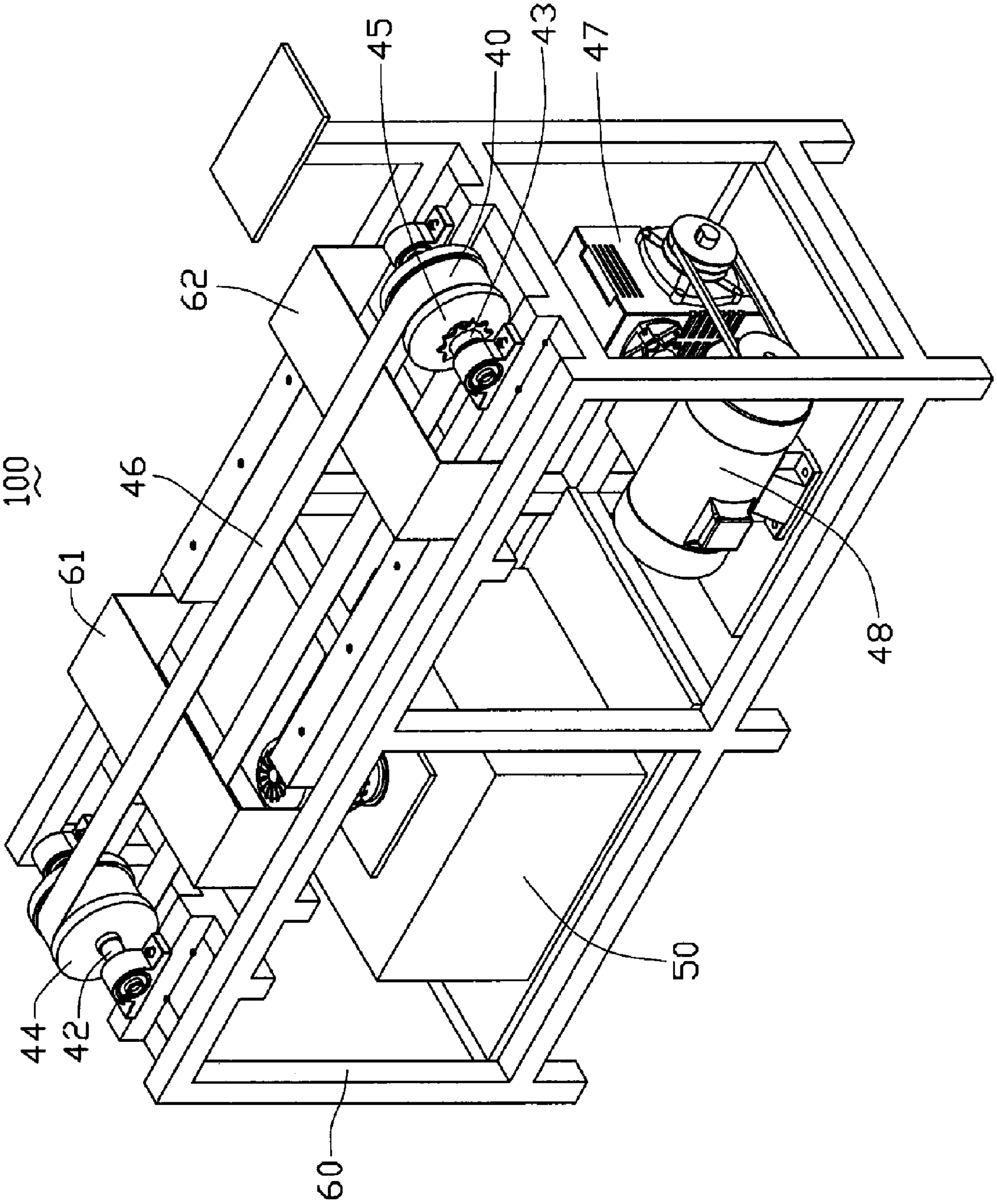
FIG. 2 is a partly assembled, isometric view of the automatic dotting machine of FIG. 1.

Also referring to FIG. 2, the conveying device 40 includes a pair of pulleys 44, 45 mounted on tow opposite ends of the bed 60, respectively. The pulleys 44, 45 include shafts 42, 43, respectively. An endless belt 46 is mounted on the pulleys 44, 45, for receiving each workpiece 200 falling from the feeding device 10 and for conveying the fallen workpiece 200 to the predetermined dotting region. A pair of supporting brackets 61, 62 is mounted on the bed 60, for supporting the belt 46. A motor 48 and a gear box 47 linked to the motor 48 are mounted under the bed 60 for driving the shafts 43 to rotate, whereby the pulleys 44, 45 and the shaft 42 rotate together. An upper layer of the belt 46 runs from the pulley 44 to the pulley 45 above the motor 48 to convey the workpiece 200 from the feeding device 10 to the predetermined dotting region.

Figure 3:
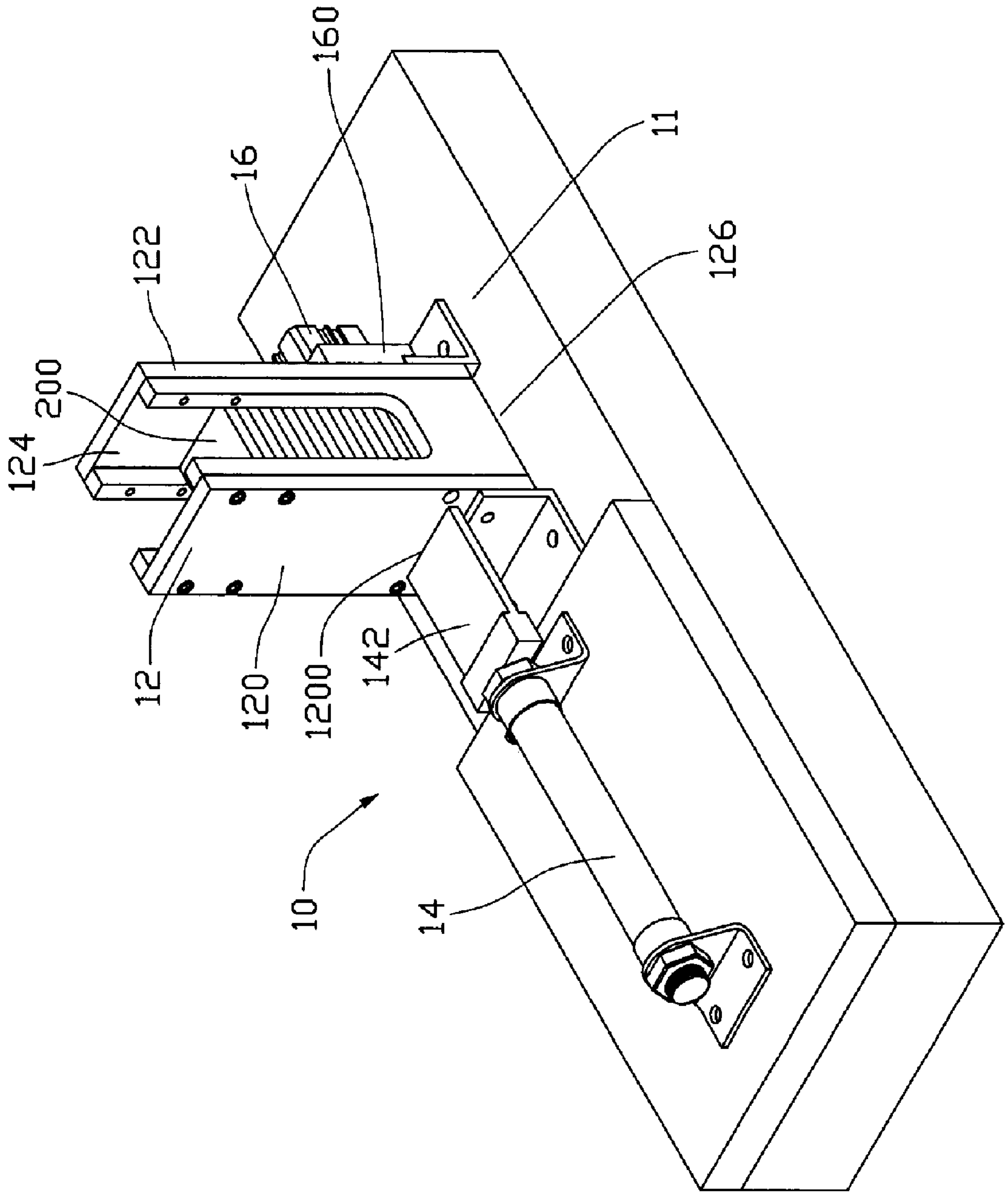
FIG. 3 is an assembled, isometric view of a feeding device of the dotting machine of FIG. 1.
Figure 4:
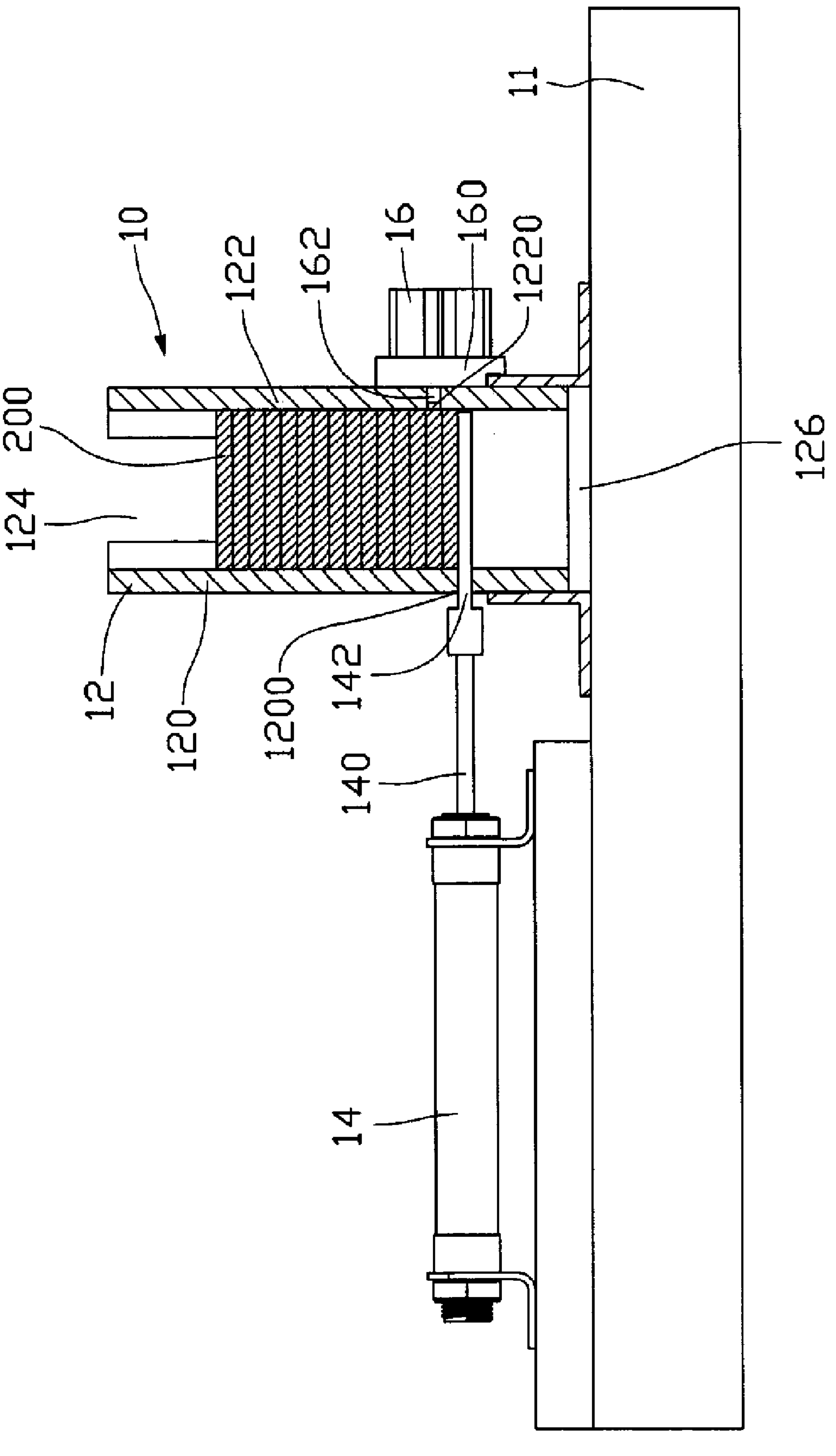
FIGS. 4 and 5 are front views of the feeding device of FIG. 3 in two different operating positions, respectively.
Figure 5:
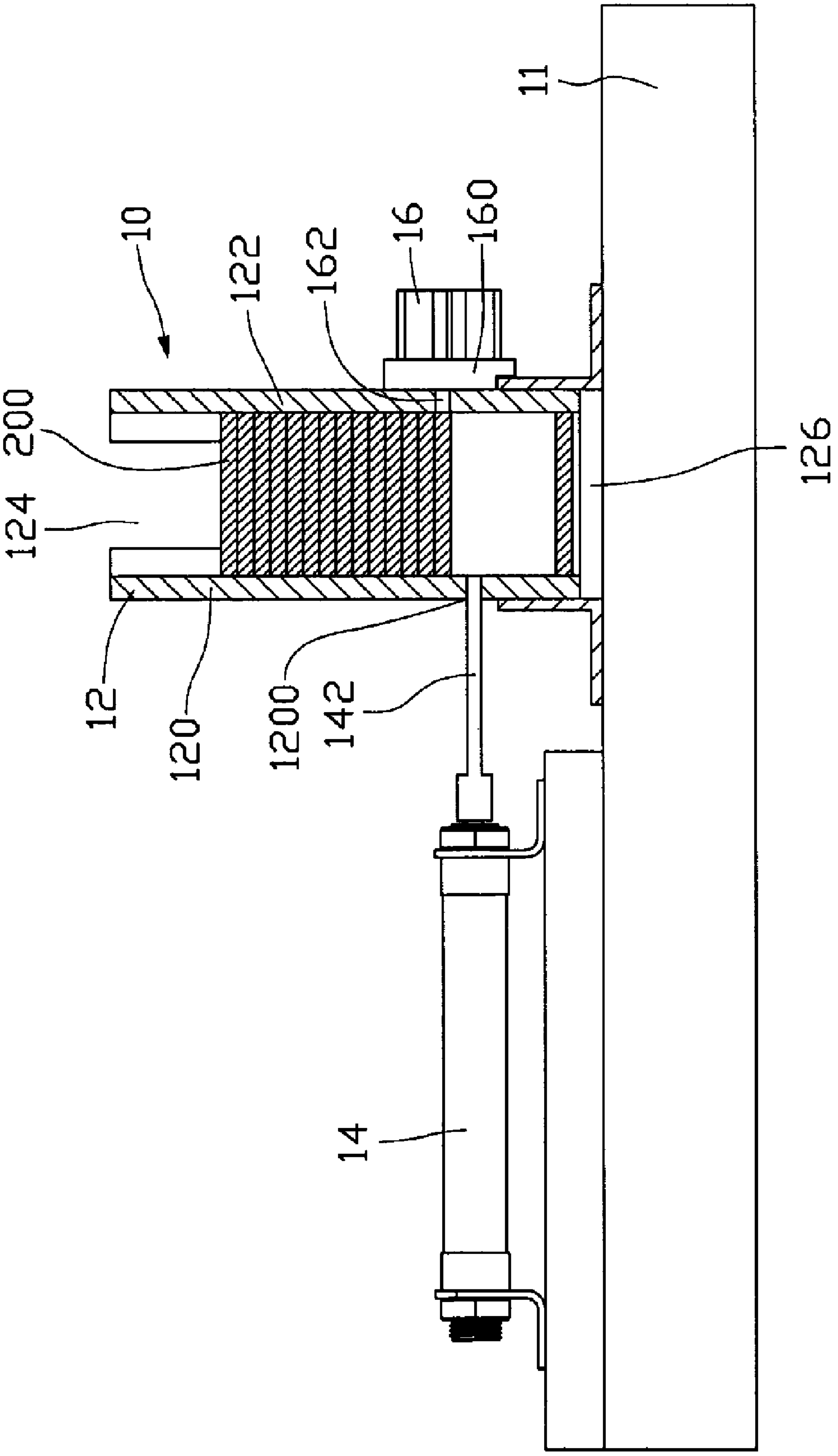

Also referring to FIGS. 3-5, the feeding device 10 is broadly described as comprising a mounting plate 11 mounted onto the bed 60. The plate 11 is positioned between the pulley 44 and the supporting bracket 61. A rectangular feed box 12 is vertically mounted on the plate 11 for receiving the workpieces 200 therein. The feed box 12 has an upper opening 124 for putting the workpieces 200 therein, and a lower opening 126 for unloading the workpieces 200 therefrom. Each workpiece 200 has a same thickness. The belt 46 is below the lower opening 126 for receiving the workpieces 200 unloaded from the lower opening 126 of the feed box 12. The feed box 12 has a pair of symmetrical lateral walls 120, 122. Each wall 120, 122 defines a notch 1200, 1220 therein. A vertical distance between the two notches 1200, 1220 is equal to the thickness of two workpieces 200. A supporting cylinder 14 is positioned at a left side of the lateral wall 120. The cylinder 14 has a slide piston rod 140 connected to a controllable supporting plate 142. The supporting plate 142 contacts a first workpiece 200 in a bottom-up direction of the feed box 12. The supporting plate 142 extends through the feed box 12 from the notch 1200 and abuts against an inner surface of the lateral wall 122, for supporting the workpieces 200 thereon. The supporting plate 142 is drawn by the piston rod 140 of the cylinder 14 out of the feed box 12 under a command of the programmed control unit 30 when the feeding device 10 works. A clamping cylinder 16 is positioned at a right side of the lateral wall 122 via a positioning block 160. The cylinder 16 has a slide piston rod (not shown) connected to a controllable bar 162. The piston rod of the cylinder 16 may push the bar 162 to extend through the notch 1220 and abut against a side of a second workpiece 200 pointed in the bottom-up direction under a command of the programmed control unit 30. Referring to FIG. 5, when the feeding device 10 works, the bar 162 firmly abuts against the second workpiece 200, whereby the bar 162 and an inner surface of the lateral wall 120 firmly clasp the second workpiece 200, and the other workpieces 200 on the second workpiece 200 are supported by the second workpiece 200. Meanwhile the supporting plate 142 is drawn out of the feed box 12, whereby the first workpiece 200 is dropped on the belt 46 from the lower opening 126 of the feed box 12 because of the effect of gravity. Referring to FIG. 4, once the first workpiece 200 is dropped, the supporting plate 142 is pushed backed by the piston rod 140 of the cylinder 14 to extend through the feed box 12 and abut against the inner surface of the lateral wall 122. Simultaneously, the bar 162 is drawn from the notch 1220 and is separated from the second workpiece 200 such that the remainder workpieces 200 are dropped on the supporting plate 142 because of the effect of gravity. The workpiece 200 hereinafter means the first workpiece 200 prepared to be dotted.

Figure 6:
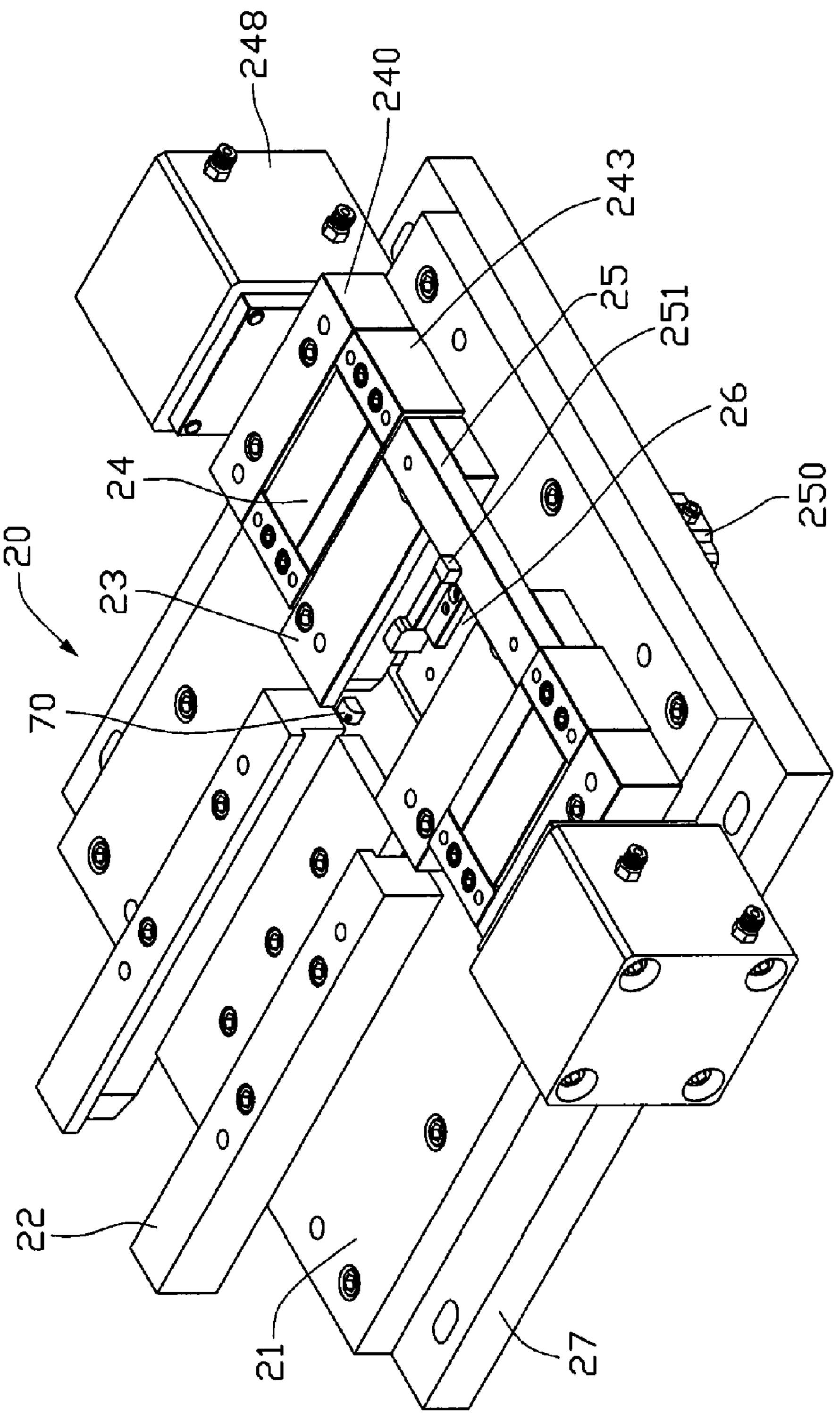
FIG. 6 is an assembled, isometric view of a working apparatus of the dotting machine of FIG. 1.

Please referring to FIG.1 and FIG. 6, the working apparatus 20 is mounted on the bed 60 and positioned between the two supporting brackets 61, 62 via two boards 21, 27 which are linked together. The working apparatus 20 comprises a positioning device (not labeled). The positioning device comprises a pair of L-shaped templates 23 symmetrically and respectively located at flanks (not labeled) of the belt 46, and a baffling plate 25 mounted on front ends of the templates 23. The baffling plate 25 interconnects tops of the front ends of the templates 23. There is a distance between bottoms of the templates 23 and a bottom of the baffling plate 25 such that the belt 46 extends through a space defined between the templates 23 and below the baffling plate 25. A pair of L-shaped guide plates 22 is symmetrically and respectively located at the flanks of the belt 46 and adjacent to back ends of the templates 23, for guiding the workpiece 200 to a region of the positioning device. There is a space between the back end of the template 23 and a front end of the guide plates 22, for mounting a sensor 70 therein. When the workpiece 200 unloaded from the feed box 12 moves through the sensor 70, the sensor 70 gives a signal to the programmed control unit 30 and the feed box 12 begins to work to release the workpieces 200 in sequence, under control of the programmed control unit 30.

Figure 8:
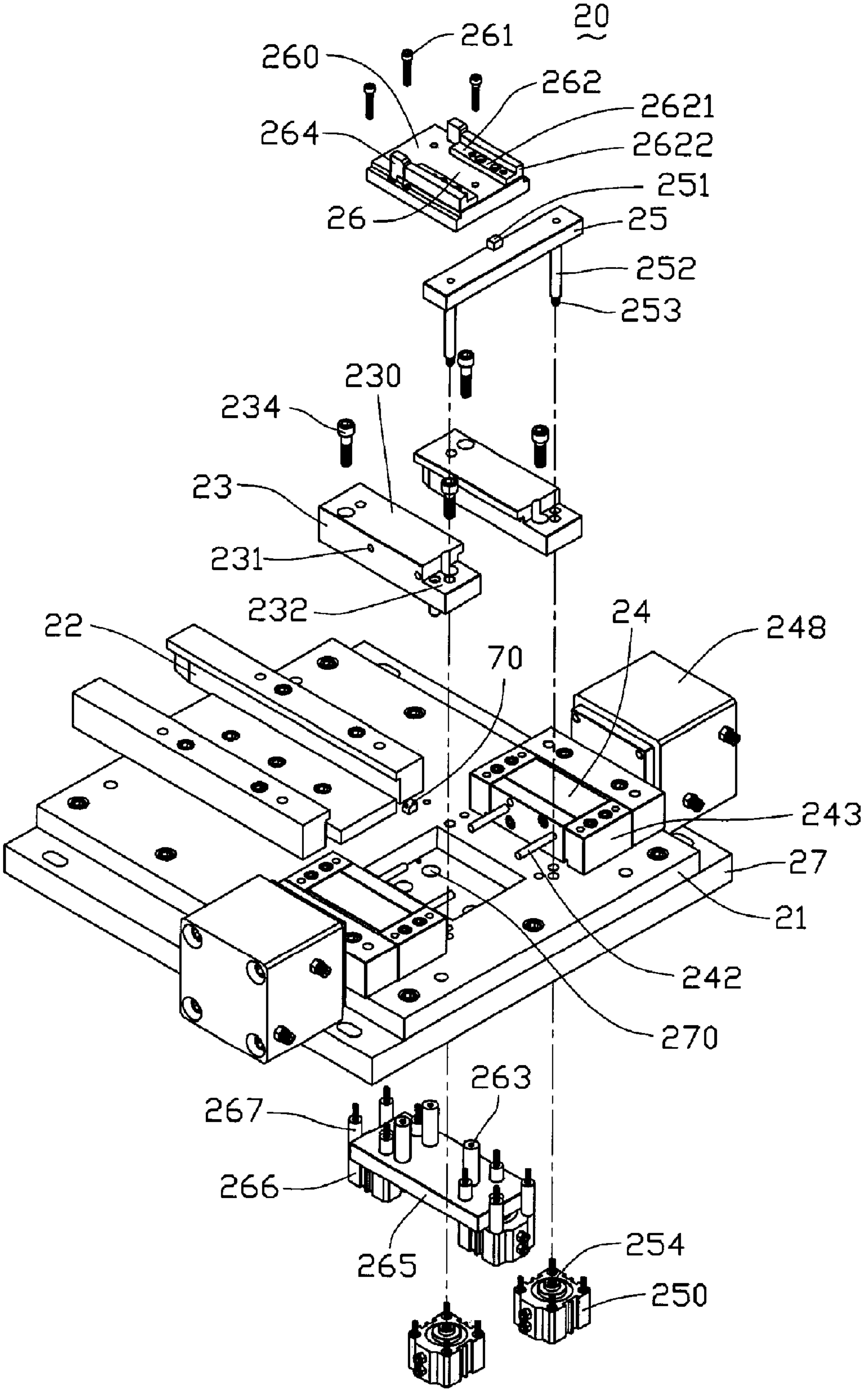
FIG. 8 is similar to FIG. 7, but shown from another aspect.
Figure 9:
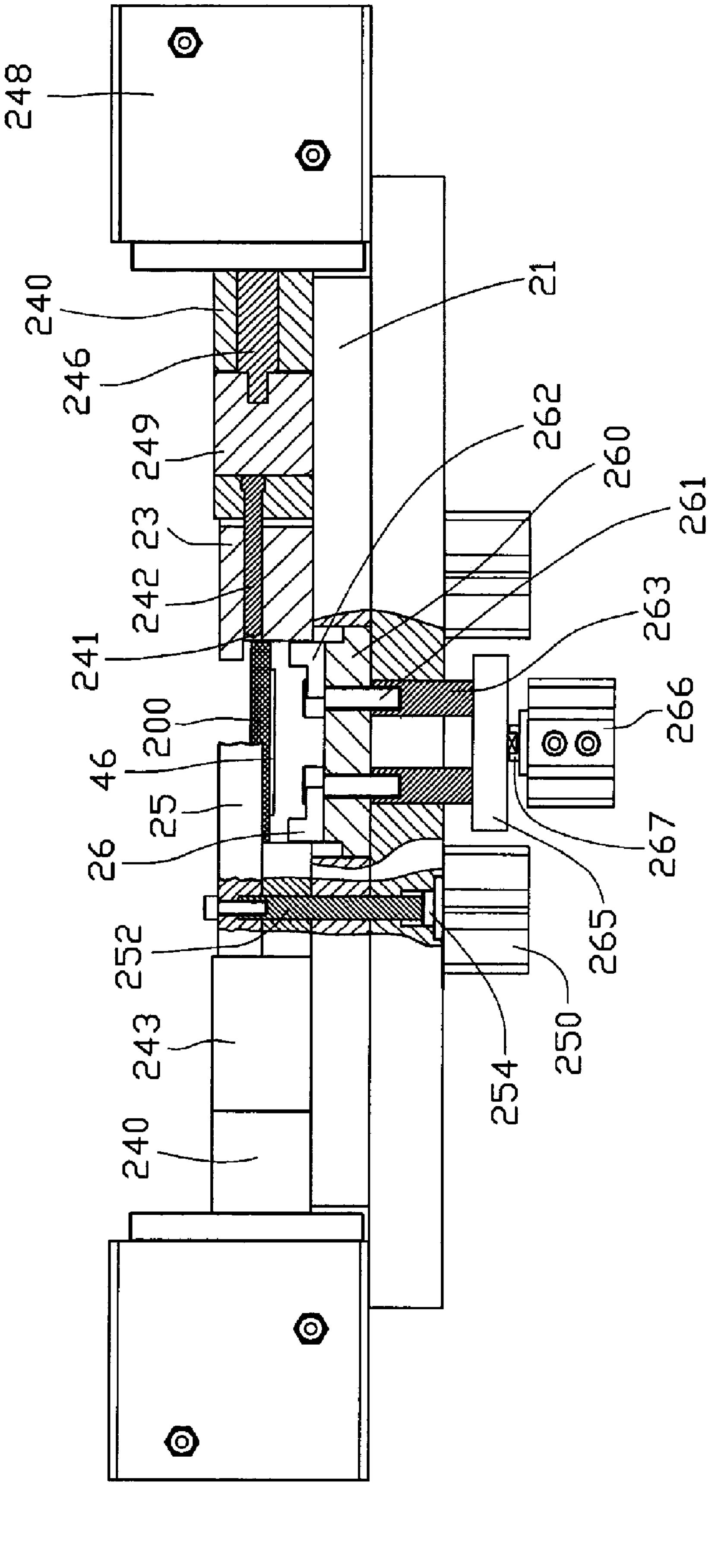
FIGS. 9-11 are front and partly cut-away views of the working apparatus of FIG. 6
Figure 10:
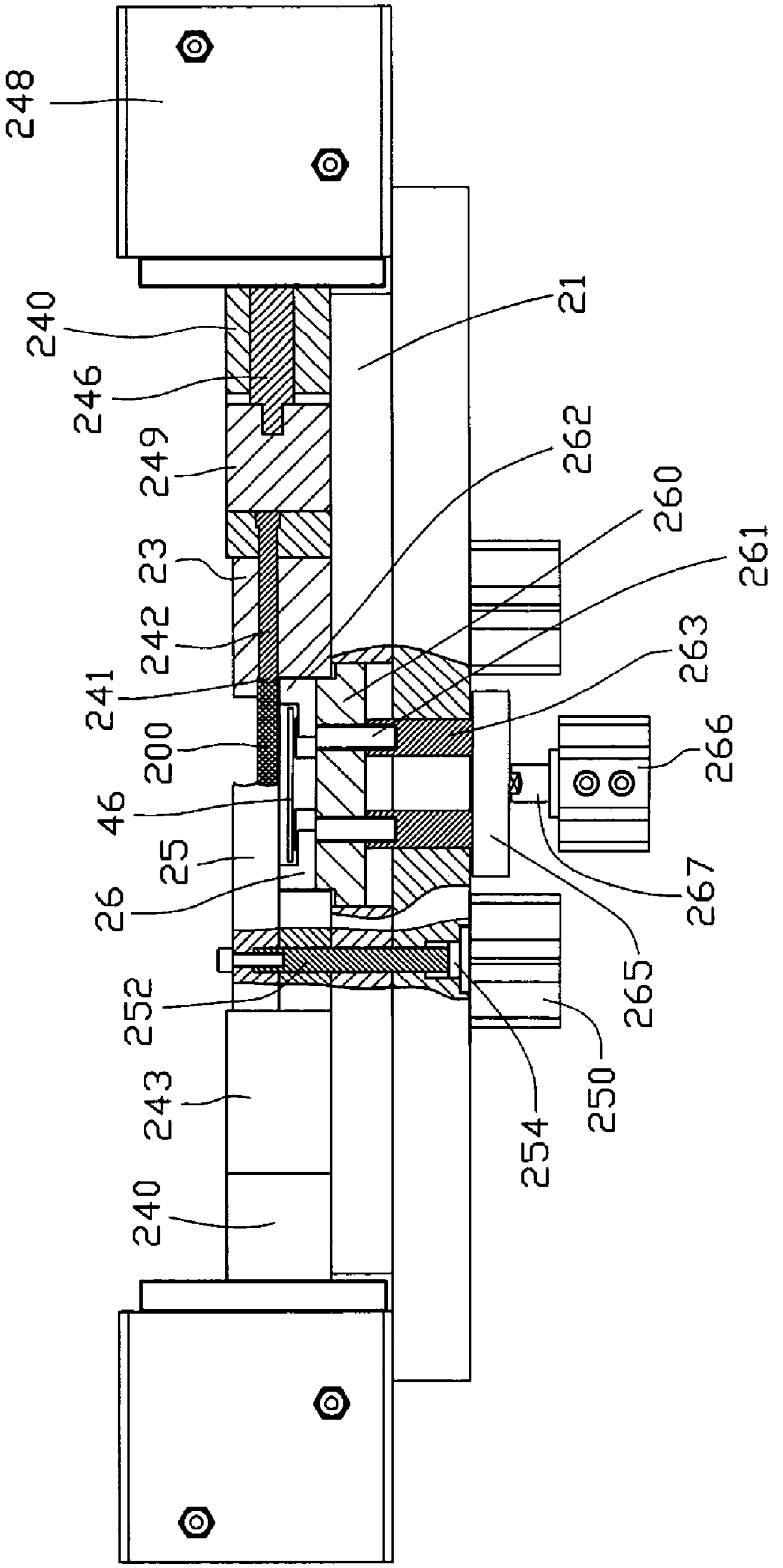
Figure 11:
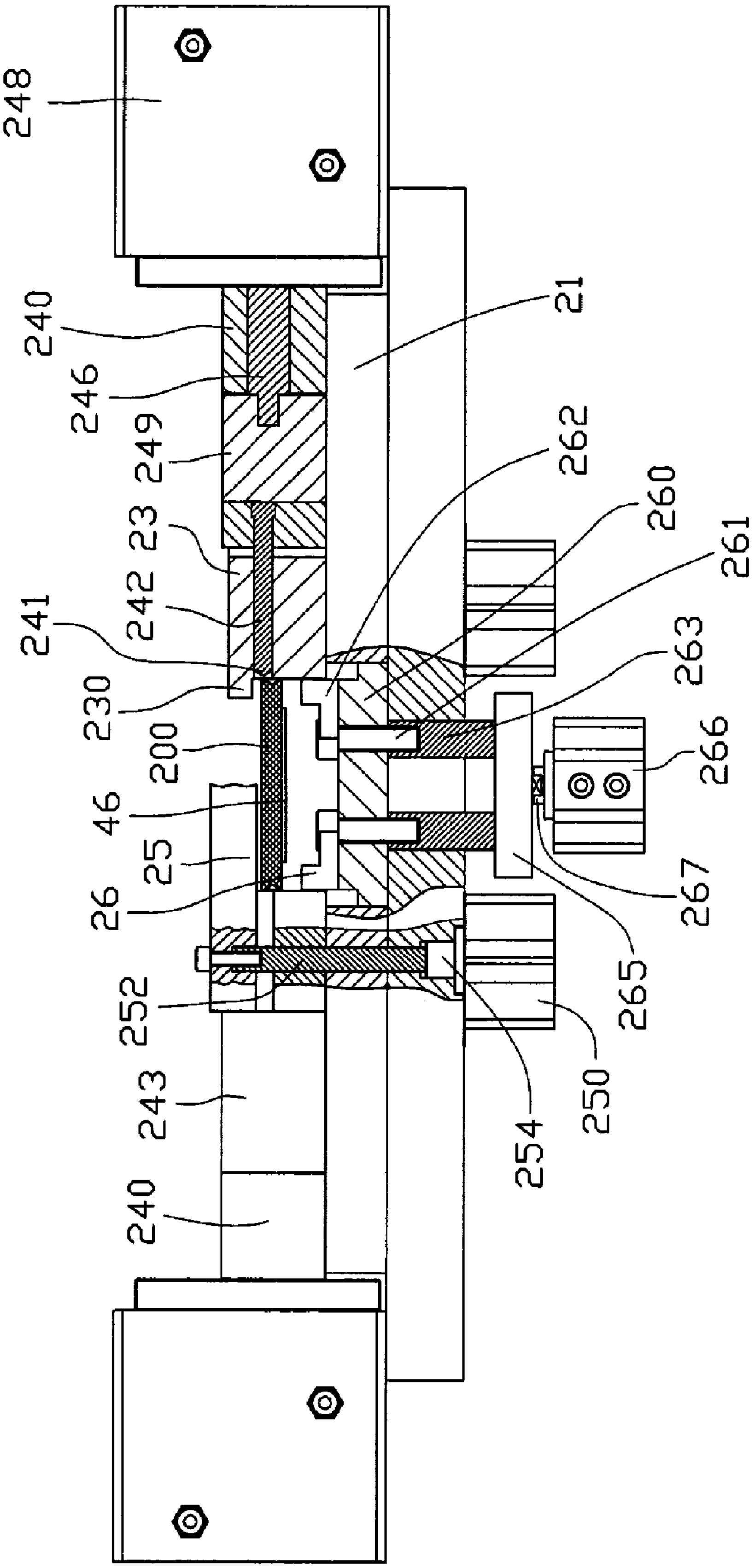

Please referring to FIG. 8, each template 23 is mounted onto the board 21 via a pair of screws 234. The template 23 has a top portion 230 protruding from an inner surface thereof. A depression 232 is formed at the front end of the template 23, for mounting the baffling plate 25 thereon. The template 23 defines a pair of horizontal through holes 231 at external lateral side thereof. The baffling plate 25 connects with a pair of posts 252. The posts 252 each have a free end forming external threads 253. A pair of cylinders 250 is located below the board 27. The cylinder 250 has a piston rod 254. The posts 252 extend through the boards 21, 27 and threadedly engage with the piston rods 254, respectively. The baffling plate 25 can slide up and down along a straight line via the extension and retraction of the piston rods 254 of the cylinders 250. A sensor 251 is mounted on the baffling plate 25.

Figure 7:
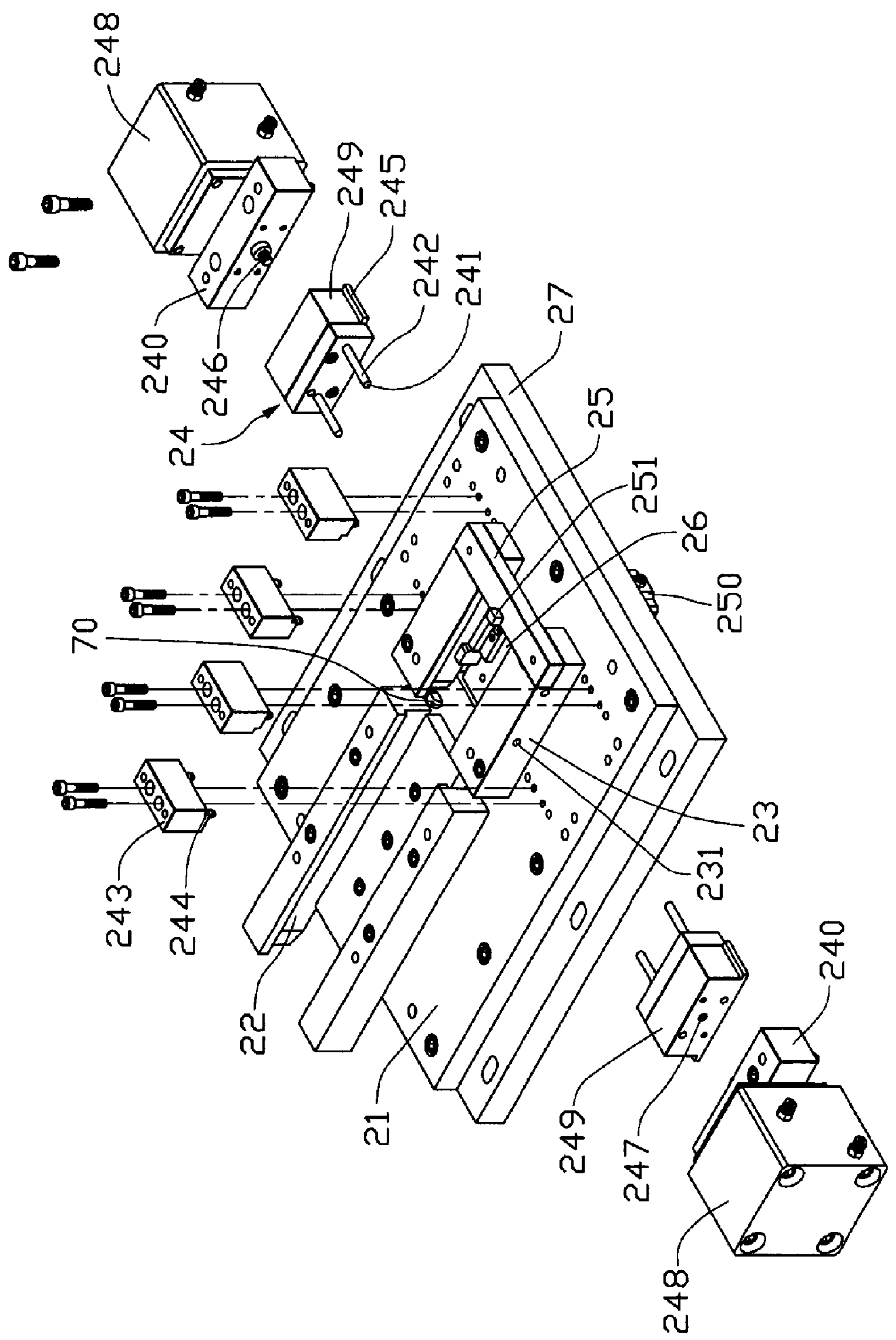
FIG. 7 is an exploded view of FIG. 6.

Please referring to FIG. 7, the working apparatus 20 further comprises a punching device 24. The punching device 24 comprises a pair of punching holders 249 symmetrically and respectively located the left and right sides of the templates 23. Each punching holder 249 forms a pair of guide blocks 245 at end edges of opposite front and back sides thereof, respectively. The punching holder 249 comprises a pair of spaced punches 242, facing to the template 23. The punch 242 is used for extending through the through hole 231 and punching a dent on a lateral side of the workpiece 200. The punch 242 has a taper head 241 for conveniently dotting the workpiece 200. The punching holder 249 defines a threaded hole 247, opposite to the punch 242. A hydraulic cylinder 248 is connected to the punching holder 249, for providing hydraulic force to the punching device 24. The hydraulic actuator 50 provides hydraulic fluid to the hydraulic cylinder 248. The hydraulic cylinder 248 is fixed to the board 21 via a fixer 240. The hydraulic cylinder 248 has a piston rod 246 extending through the fixer 240 and threadedly engaging with the threaded hole 247 of the punching holder 249. The piston rod 246 pushes the punching holder 249 to slide along the left-right direction. A pair of punching fixers 243 is mounted on the boards 21, 27 via screws (not labeled), and is positioned beside front and back sides of each punching holder 249, respectively. Each punching fixer 243 defines a groove 244 corresponding to the guide block 245. When the punching holder 249 moves by push of the piston rod 246, the guide block 245 slides along the groove 244 of the punching fixer 243 for performing the dotting to the workpiece 200.

Please again referring to FIG. 8, the working apparatus 20 further comprises a sliding device 26 mounted between the two templates 23, for lifting the workpiece 200 to the predetermined position to be dotted. The sliding device 26 comprises a retainer plate 260 positioned between the two templates 23, a pair of symmetrical lock bocks 262 mounted on the retainer plate 260, a pair of sliding blocks 264 abutting against back ends of the lock blocks 262, and a back plate 265 below the board 27. The two lock blocks 262 are positioned at the flanks of the belt 46, respectively. The lock blocks 262 have back ends abutting against the sliding blocks 264, and front ends abutting against the baffling plate 25. Each lock block 262 has an L-shaped configuration, and comprises a horizontal plate 2621 and a vertical plate 2622. The vertical plate 2622 has a top surface below a top surface of the sliding block 264. The belt 46 runs over the horizontal plate 2621. The workpiece 200 is conveyed on top surfaces of the two vertical plates 2622 of the two lock blocks 262 via the belt 46. Each sliding block 264 is slidably positioned on the retainer plate 260 at the back end of the lock block 262 such that the sliding blocks 264 are adjustable to always abut a back end of the workpiece 200 when the workpiece 200 is conveyed to the top surfaces of the vertical plates 2622 for being dotted. The back plate 265 forms three posts 263 having internal threads. Tree screws 261 extend through the retainer plate 260 and the boards 21, 27 to threadedly engage with the posts 263, whereby the retainer plate 260 connects with the back plate 265. Two cylinders 266 are positioned below the back plate 265. Each cylinder 266 has four shanks 267 having external threads. The shanks 267 engage in threaded holes 270 of the board 27 so as to fix the cylinders 266 to the board 27. Two shanks 267 of each cylinder 266 extend through the back plate 265 to enable the back plate 265 to move up and down relative to the shanks 267. Each cylinder 266 connects a piston rod (not shown) at central portion thereof to push the back plate 265 to move. The movable back plate 265 drives the whole sliding device 26 to move straightly upwards and downwards, thereby lifting the workpiece 200 to the predetermined position to be dotted.

With reference to FIGS. 1, 4-5, and 9-11, the dotting machine 20 begins to work by turning power on. The belt 46 is driven by the motor 48 and the gear box 47. The first workpiece 200 is unloaded from the feeding device 10 by a command of the programmed control unit 30. Once the unloaded first workpiece 200 runs between the guide plates 22 and the templates 23, the sensor 70 gives out a signal to the programmed control unit 30, and the feeding device 10 begins next cycle work and next workpiece 200 is unloaded therefrom via a command of the programmed control unit 30. Thus, the feeding device 10 unloads the workpieces 200 with the same interval to the belt 46, which then conveys the wokpieces 200 to the predetermined dotting region. When the workpiece 200 runs to the baffling plate 23 and touch the baffling plate 23, the sensor 251 gives out a signal to the programmed control unit 30, and the cylinders 266 push the sliding device 26 to move upwardly until the workpiece 200 abuts against the top portions 230 of the templates 23 and separates from the belt 46. Simultaneously, the heads 241 of the punches 242 of the punching devices 24 extend from the through holes 231 of the templates 23 and dot dents to corresponding positions of the workpiece 200. After dotting, the punches 242 of the punching devices 24 are withdrawn from the workpiece 200, and the sliding device 26 moves downwardly to the original position to enable the workpiece 200 to fall to the belt 46. Meanwhile, the baffling plate 25 is controlled to move upwardly by the cylinders 250 such that there is enough space between the workpiece 200 and a bottom surface of the baffling plate 25 to enable the workpiece 200 fallen to the belt 46 to travel through the space below the baffling plate 25. After the pass of the workpiece 200, the baffling plate 25 returns to the original position and contacts with the templates 23. The workpiece 200 runs toward the pulley 45 and falls down from the belt 46. A slantwise plate (not shown) may be mounted on the bed 60, adjacent to the pulley 45 such that the wokpiece 200 falls along the slantwise plate to a predetermined position.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An automatic dotting machine for performing dotting of workpieces in a programmed manner, comprising:

a feeding device for unloading the workpieces one by one with same interval;

a conveying device for receiving the unloaded workpieces from the feeding device and conveying the workpieces to a predetermined dotting region;

a sensor unit for detecting whether the workpieces reach the predetermined dotting region;

a programmed control unit for controlling the whole process of the dotting, and receiving signal detected by the sensor unit and then sending out a command;

a sliding device for moving the workpieces to a predetermined dotting position after receiving the command of the programmed control unit;

a positioning device for clamping and positioning the wokpieces to the predetermined dotting position to be dotted; and a punching device for punching dents on the workpieces after the workpieces are positioned to the predetermined dotting position;

wherein the conveying device automatically unloads a next workpiece once receiving the command of the programmed control unit.

2. The automatic dotting machine as described in claim 1, wherein the feeding device comprises a feed box for receiving the workpieces therein, a controllable supporting plate being capable of extending through the feed box from one side of the feed box and supporting the workpieces thereon, and a controllable bar extending through the feed box from another opposite side of the feed box and abutting against a side of an appointed workpiece under the command of the programmed control unit.

3. The automatic dotting machine as described in claim 2, wherein the feed box of the feeding device connects a supporting cylinder and a clamping cylinder at the two opposite sides thereof, the supporting cylinder connects and controls the supporting plate, the clamping cylinder connects and controls the bar.

4. The automatic dotting machine as described in claim 3, wherein the feed box has a pair of symmetrical lateral walls, each wall respectively defines a notch, a distance between the two notches is equal to a thickness of two workpieces, the supporting plate extends through the notch of one lateral wall and abuts against an inner surface of the other lateral wall and contacts with a first workpiece in a bottom-up direction of the feed box, the bar extend through the notch of the other lateral wall and abuts against a side of a second workpiece above the first workpiece.

5. The automatic dotting machine as described in claim 2, wherein the conveying device comprises a pair of shafts, a pair of pulleys respectively mounted on the shafts, and an endless belt mounted on the pulleys for receiving the workpiece unloaded from the feeding device and conveying the unloaded workpiece to the positioning device.

6. The automatic dotting machine as described in claim 1, wherein the positioning device comprises a pair of templates symmetrically and respectively located at flanks of the belt, and a baffling plate interconnecting the templates and located above the belt.

7. The automatic dotting machine as described in claim 6, wherein the workpiece is conveyed between the two templates and lifted to the predetermined dotting position by the sliding device, then the workpiece is fastened by the positioning device so as to be dotted by the punching device.

8. The automatic dotting machine as described in claim 6, wherein the sensor unit comprises a first sensor and a second sensor.

9. The automatic dotting machine as described in claim 8, wherein a pair of guide plates is symmetrically and respectively located at the flanks of the belt and adjacent to the templates for guiding the workpieces to the positioning device, the first sensor unit is mounted between the template and the guide plate, the feeding device controlled by the command of the programmed control unit unloads the next workpiece upon receiving the signal of the first sensor when the workpiece runs to the first sensor.

10. The automatic dotting machine as described in claim 8, wherein the second sensor is mounted on the baffling plate, the sliding device controlled by the command of the programmed control unit pushes the workpiece upwardly to the predetermined dotting position upon receiving the signal of the second sensor when the workpiece touches the baffling plate.

11. The automatic dotting machine as described in claim 8, wherein the baffling plate has a post connected to a cylinder controlling the baffling plate moves upwardly and downwardly.

12. The automatic dotting machine as described in claim 8, wherein the template comprises a top portion protruding from an inner surface thereof for abutting against the workpiece to stop the workpiece to move upwardly.

13. The automatic dotting machine as described in claim 12, wherein the sliding device comprises a retainer plate positioned between the two templates, a pair of symmetrical lock bocks mounted on the retainer plate, a pair of sliding blocks abutting against ends of the lock blocks, and a back plate below the retainer plate, and at least one post connecting the retainer plate and the back plate.

14. The automatic dotting machine as described in claim 13, wherein one side of the workpiece abuts against the baffling plate and the other opposite side of the workpiece abuts against the sliding blocks, and a top surface of the workpiece abuts against the top portion of the templates during the dotting of the workpiece.

15. The automatic dotting machine as described in claim 14, wherein a cylinder is mounted to the back plate such that the workpiece on the sliding device can be lifted to abut against the top portion of the templates by the sliding device via push of the cylinder.

16. The automatic dotting machine as described in claim 15, wherein the punching device comprises a pair of punching holder respectively and symmetrically located two sides of the templates, each punching holder comprises a pair of spaced punches facing to the template, the punch is used for extending through the template and dotting a dent on the workpiece, the punch has a taper head for facilitating dotting of the workpiece.

17. The automatic dotting machine as described in claim 16, wherein an hydraulic cylinder is connected to the punching device for pushing the punching device to dot the workpiece.

* * * * *